March 4, 1924.
J. STEJSKAL, JR
1,486,051
POWER OPERATED HAND IMPLEMENT
Filed Jan. 25, 1923
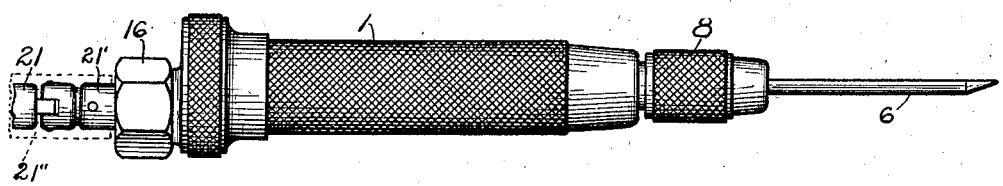
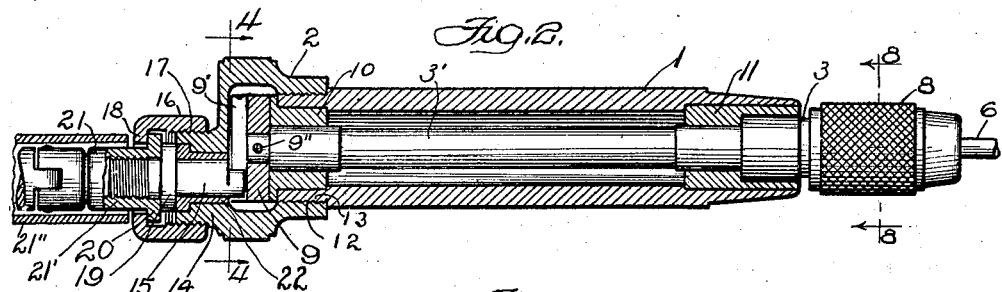
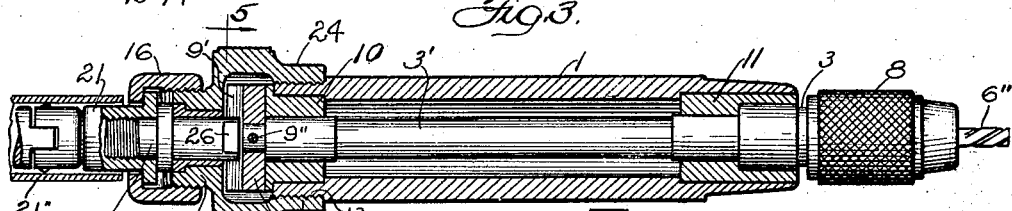
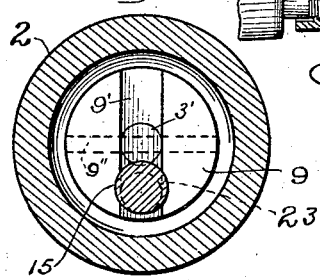
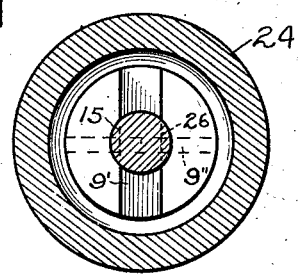
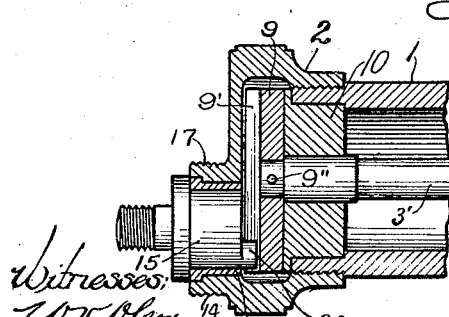
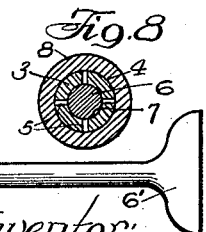
Inventor:
Joseph Stejskal, Jr.

Patented Mar. 4, 1924.

1,486,051

UNITED STATES PATENT OFFICE.

JOSEPH STEJSKAL, JR., OF OAK PARK, ILLINOIS.

POWER-OPERATED HAND IMPLEMENT.

Application filed January 25, 1923. Serial No. 615,430.

*To all whom it may concern:*

Be it known that I, JOSEPH STEJSKAL, Jr., a citizen of the United States of America, and a resident of Oak Park, county of Cook, and State of Illinois, have invented a new and useful Improvement in Power-Operated Hand Implements, of which the following is a specification.

This invention relates to power operated hand implements, and especially to such devices having a handle adapted to receive interchangeably a plurality of working members.

The main objects of the invention are to provide for such an implement, a handle member having a grip part and provided with a chuck adapted to receive various implements including a routing tool and a drill, and also provided with power transmission mechanism at the opposite end or head of said handle, having various adjustments to correspond with the needs of the several members; and to provide such a device adapted for adjustment to oscillate a routing tool or valve grinder and to rotate a drill.

Illustrative embodiments of this invention are shown by the accompanying drawings in which:—

Figure 1 is a side view of a hand implement equipped with a routing tool at one end and a power supply means at the opposite end.

Figure 2 is mainly a vertical axial section through Figure 1.

Figure 3 is an axial section through an implement mainly similar to Figure 1, but equipped with a drill.

Figure 4 is a cross section on the line 4—4 of Figure 2.

Figure 5 is a cross section on the line 5—5 of Figure 3.

Figure 6 is a fragmentary view mainly in axial section of a modified form of implement equipped with a wide angle oscillating bit adapted to actuate a valve as required in grinding.

Figure 7 is a fragmentary view showing the right end of an implement similar to that shown in Figure 3 but with a grinding member substituted in place of the drill.

Figure 8 is a cross section at 8—8 on Figure 2.

In the construction shown in the drawings (first see Figures 1 and 2), the implement comprises a cylindrical handle 1, having a head 2 at one end, where power is received, and a tool holding chuck 3 at the opposite end.

The chuck 3 at its outer end is formed as shown in Figure 4, and is exteriorly threaded as shown at 4. This end of the chuck is tubular and is longitudinally slotted as at 5. When the shank of a routing tool, drill, or other similar tool 6 is inserted in the aperture 7 it is clamped in place by an interiorly threaded sleeve 8, which is knurled exteriorly to permit ready tightening by hand on the slotted and exteriorly threaded chuck 3, as usual with such chucks.

The opposite end of said chuck is elongated and of shaft-like character as at 3', and this shank extends through the handle 1 for engagement with power supply means in the head 2. For this purpose the shank 3' is provided (at the left end as viewed in Figure 2) with a broad flat head 9, secured detachably thereto in a rigid manner, which head is provided with a diametrical slot 9', the function of which will be hereinafter explained. Said head 9 is preferably held in place by a diametrically disposed removable pin 9''. Bearings for said chuck are provided in the form of bushings 10 and 11, preferably of brass, mounted rigidly in the ends of the steel handle 1.

The handle head 2 is of hollow cap-shape and is interiorly threaded as at 12 to engage the corresponding exterior threads 13 on the handle 1. The outer end of said head 2 is provided with an eccentric longitudinal tubular projection on hub 14 to receive a short transmission shaft 15. Said shaft 15 is a rotary crank oscillator device to operate as will be described. It is secured in place by an interiorly threaded hexagonal bushing 16 engaging said hub 14 at 17. Said bushing is provided with an inwardly turned flange 18 to engage the radial flange or shoulder 19 on said shaft, with the flange 20 of the power supply shaft 21 interposed. Hub 14 has a bearing bushing 22 for the shaft or connector 15.

The shaft 15 at its inner end has a slightly eccentric crank part or crank pin 23 adapted to play in the slot 9' of chuck head 9, either half or end of said slot being actually used with a given setting. The eccentricity of hub 14 and the length of the virtual crank arm for pin 23 are so related that the pin 23 never reaches or passes the center of slot 9' or the axis of shank 3. Hence, rotation of connector 15 oscillates the chuck 3 and with it whatever tool 6 is held thereby.

In Figure 2, the eccentricity of the pin 23 relative to shaft 15 is slight, and as a consequence the chuck 3 oscillates through a small angle, as best adapted for proper actuation of a routing tool shown in Figure 1. In Figure 6 the eccentricity of the pin 23 is greater so that its range of travel is greater, and it consequently oscillates the chuck and tool through a wide angle, such as required in valve grinding. Here we see the tool 6', adapted for engaging the slot of a valve (not shown) for oscillating the same for grinding.

The flexible power member 21 is provided with a threaded end connector socket member 21' adapted to receive the correspondingly threaded end of shaft 15. A flexible tubular casing 21'' is provided for shaft 21.

Referring to Figure 3, the implement is similar to that shown in Figure 2, except that the handle head and transmission shaft are of modified form adapted to provide for continuous rotary movement of chuck 3 instead of oscillatory movement. For this purpose, the head 24 is symmetrical in shape and its hub part 24' is coaxial with the handle 1. The transmission shaft 25 is provided on its inner end with a flat head 26 instead of a crank pin, which head fits in the middle of slot 9' so that rotation of shaft 25 will cause the chuck 3 to rotate therewith. Otherwise, the construction is similar to that of Figure 2.

Referring to Figure 7, only the right-hand end or tool-holding part of the implement is shown with a grinding wheel 27 attached in place of a drill or other tool. In this instance, the detachable tool member instead of having a shank to be gripped by the chuck 3 in the usual way, is provided with a cup-shaped supporting part 28, which is interiorly threaded to fit on the outside of the chuck in place of the sleeve 8. The tool 27 may equally well be in the form of a buffer or other similar device.

In order to change the implement from a router to a drilling tool the head 2 is exchanged from head 24, and vice versa. This is accomplished by disconnecting the power shaft 21 at 17. Then shaft 15 is exchanged for shaft 25 by unscrewing at 21'. The method of interchanging tools relative to chuck 3 is thought to be clear without further explanation.

Although only two specific embodiments of this invention are herein shown and described, it is to be understood that no attempt has been made to show all practical forms of embodiment and that some of the details of the constructions shown may be altered or omitted without departing from the spirit of this invention as defined by the following claims.

I claim:

1. A power operated hand implement comprising a handle part, a rotary power transmitting member mounted in said handle part, means including a flexible torsion shaft and an interchangeable connector adapted to effect a specific mode of operation for supplying rotary power to one end of said transmitting member and means for attaching a working tool to the opposite end of said transmitting member.

2. A power operated hand implement comprising a handle having a head at one end and a chuck at the other end adapted to receive tools interchangeably, said head having a rotary power receiving connector operatively connected to said chuck, said connector and chuck being mutually formed for cooperation to produce oscillation of said chuck.

3. A power operated hand implement comprising a handle having a chuck adapted to receive tools interchangeably at one end of the implement, in combination with a rotary power receiving connector mounted eccentrically at the opposite end, said connector and chuck being mutually formed for cooperation to produce oscillation of said chuck.

4. A tool comprising in combination a tubular handle, a chuck at one end of said handle, and a removable head at the opposite end, said chuck having a shank extending through said handle and provided with a removable end-piece of head-like character to secure said chuck in place.

Signed at Berwyn, Ill., this 20th day of Jan., 1923.

JOSEPH STEJSKAL, Jr.